(12) United States Patent
Matousek et al.

(10) Patent No.: US 7,093,707 B2
(45) Date of Patent: Aug. 22, 2006

(54) GRAIN HARVESTER MULTI-ANGULAR INCLINED DELIVERY CONVEYOR AND DRIVE

(75) Inventors: Robert A. Matousek, Milan, IL (US);
Kelvin Bennett, Geneseo, IL (US);
Peter J. Ungs, Bolingbrook, IL (US);
William Cooksey, Geneseo, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/621,835

(22) Filed: Jul. 16, 2003

(65) Prior Publication Data

US 2005/0011732 A1    Jan. 20, 2005

(51) Int. Cl.
*B65G 33/32* (2006.01)
(52) U.S. Cl. .................. 198/668; 198/666; 414/526
(58) Field of Classification Search ............. 198/666, 198/667, 668; 414/505, 523, 525, 526
See application file for complete search history.

(56) References Cited

U.S. PATENT DOCUMENTS

| 2,481,860 A | * | 9/1949 | Miller ........................ 198/666 |
| 3,347,350 A | | 10/1967 | Lindstrom et al. .......... 198/119 |
| 3,568,819 A | | 3/1971 | Mann ........................... 198/45 |
| 3,664,525 A | | 5/1972 | Herbsthofer ................. 214/17 |
| 4,093,087 A | * | 6/1978 | DeCoene .................... 198/668 |
| 4,669,945 A | | 6/1987 | Pollard et al. .............. 414/505 |
| 4,875,820 A | * | 10/1989 | Lepp et al. ................. 198/668 |
| 5,094,334 A | * | 3/1992 | Bobrowski .................. 198/668 |
| 5,184,715 A | | 2/1993 | Feteri ......................... 198/667 |
| 5,409,344 A | | 4/1995 | Tharaldson ................. 414/505 |
| 5,498,119 A | | 3/1996 | Faivre ........................ 414/528 |
| 6,042,326 A | | 3/2000 | Thomas et al. ............. 414/502 |

* cited by examiner

*Primary Examiner*—James R. Bidwell
(74) *Attorney, Agent, or Firm*—Michael G. Harms; John William Stader; Stephen A. Bucchianeri

(57) ABSTRACT

A grain delivery conveyor for a grain tank of an agricultural combine includes a first gear box including a first input connectable in rotatably driven relation to a rotatable power source for rotation about a first axis, and a first output rotatable about a second axis angularly related to the first axis by rotation of the first rotatable input; a second gear box including a second rotatable input connected in rotatably driven relation to the first output for rotation about the second axis, and a second output rotatably driveable about a third axis angularly related to the second axis by rotation of the second rotatable input; and an elongate conveyor assembly connected in rotatably driven relation to the second output, the second gear box and the conveyor being jointly pivotable about at least the second axis for varying a position of a free end of the conveyor relative to the grain tank.

10 Claims, 4 Drawing Sheets

GRAIN HARVESTER MULTI-ANGULAR INCLINED DELIVERY CONVEYOR AND DRIVE

TECHNICAL FIELD

This invention relates generally to a grain delivery conveyor for a grain tank of an agricultural combine, and more particularly, to a conveyor pivotally movable through multiple angularly oriented inclined orientations within the grain tank, including lower inclinations relative to horizontal wherein an outlet or free end of the conveyor is disposed at lower positions for initially filling the tank and for transport, and higher inclinations wherein the outlet end is higher for when the tank is at or closer to capacity.

BACKGROUND

Grain tanks of harvesting machines such as combines and the like are commonly located on the upper regions of the machine. The grain tank will commonly have in it a grain delivery conveyor, usually an auger type, oriented so as to extend upwardly to an outlet through which the grain conveyed by the conveyor is discharged into the tank. To allow utilizing the maximum grain carrying capacity of the tank, it is desirable for the outlet of the conveyor to be positionable at a relatively high elevation in or just above the tank. Additionally, it is now common to employ upwardly extending grain tank extensions around the periphery of the tank to increase its capacity, and as a result, it is desirable for the grain delivery conveyor to be positionable at a sufficient height so as to be capable of filling such higher capacity tanks.

However, a problem that is presented is that the grain delivery conveyor, and in some instances, the grain tank extensions, extend upwardly beyond a maximum height permissible or desirable for the harvesting machine when moving over public thoroughfares and in the vicinity of overhead power and communication lines, and through doorways of equipment storage and repair structures, thus necessitating somehow having the capability for lowering the conveyor and extensions. One known manner for lowering a grain delivery conveyor is to provide a capability along its length for folding. However, such folds have been found to cause grain flow disruptions in operation, which has been found to result in undue wear of components and premature failure. Also, folding does not, in itself, provide a capability for positioning the outlet end of the conveyor at locations between its uppermost operational position, and lower operational positions and a transport position. Additionally, it is a contemplated that as combines grow in size, grain tanks will be taller, longer and wider, so as to require a better capability for distributing the grain therein.

Thus, what is sought is a grain delivery conveyor and drive which can be positioned at various inclinations and positions for delivering grain to a grain tank and for transport and storage, which is not prone to rapid wear and premature failure, and which is adaptable for use with larger grain tanks.

SUMMARY

What is disclosed is a grain delivery conveyor and drive for a grain tank of an agricultural harvesting machine such as a combine, which conveyor is positionable at multiple angular inclinations in a grain tank for delivering grain thereto, and which is positionable in a lowered position or inclination for transport, without folding and resulting increased wear and failure. The conveyor includes a first gear box including a first input connectable in rotatably driven relation to a rotatable power source for rotation about a first axis, and a first output rotatable about a second axis angularly related to the first axis by rotation of the first rotatable input; a second gear box including a second rotatable input connected in rotatably driven relation to the first output for rotation about the second axis, and a second output rotatably driveable about a third axis angularly related to the second axis by rotation of the second rotatable input; and an elongate conveyor assembly connected in rotatably driven relation to the second output, the second gear box and the conveyor being jointly pivotable about at least the second axis for varying a position of a free end of the conveyor relative to the grain tank. The first gear box, second gear box and the conveyor are also optionally pivotable about the first axis for further increasing the range of positions of the free end.

DETAILED DESCRIPTION OF THE PREFERRED EMBODIMENTS

Figure 1:
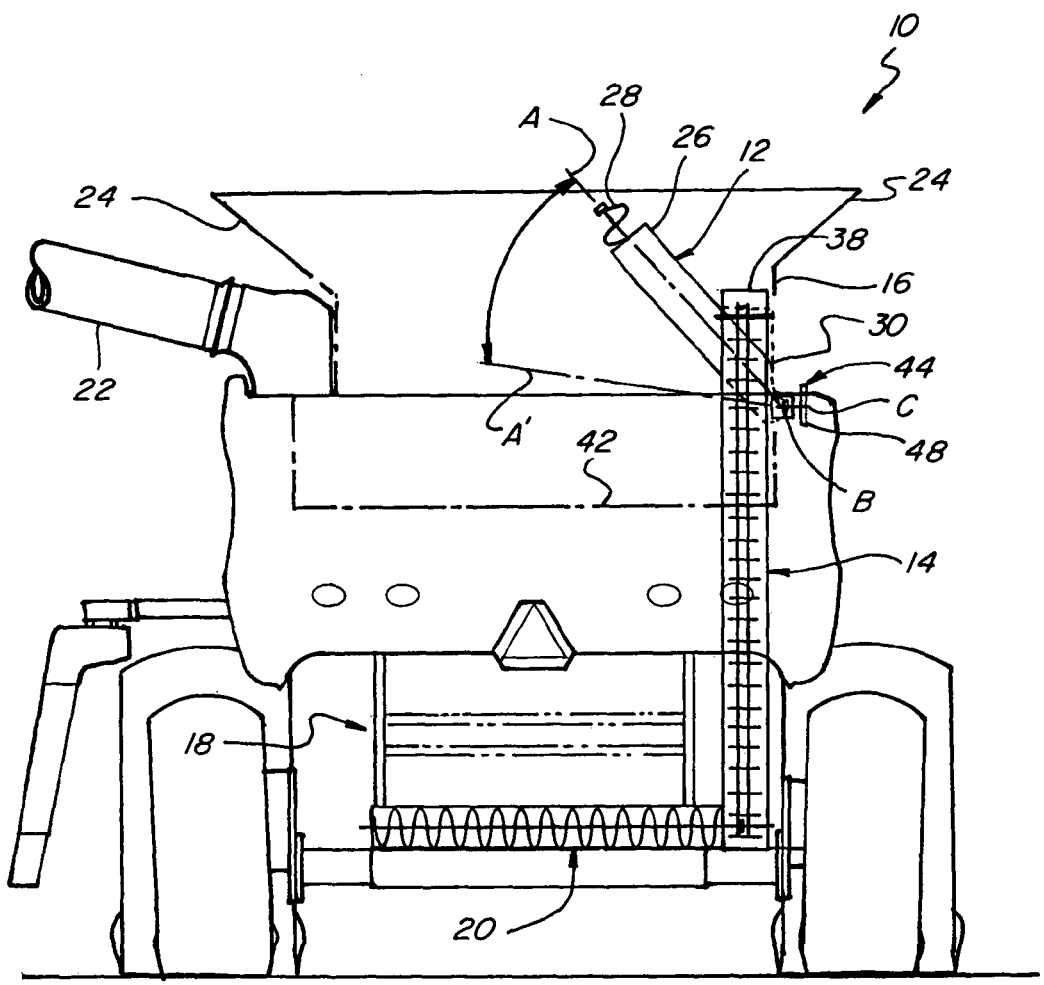
FIG. 1 is a simplified rear view of a representative agricultural harvesting machine, including a grain delivery conveyor according to the invention disposed in a grain tank of the machine for delivering grain thereto.

Referring now the drawings, in FIG. 1, a representative agricultural harvesting machine 10 is shown, including a variably angularly inclinable grain delivery conveyor 12 constructed and operable according to the teachings of the present invention, and including a rotatable element for receiving grain from a clean grain elevator 14 and carrying the grain along the conveyor and discharging it into a grain tank 16 located on an upper region of harvesting machine 10. Here, harvesting machine 10 is depicted as a well known, commercially available combine operable for harvesting a wide variety of grains, including, but not limited to, wheat, beans, corn, rice, and the like. Typically, the grain is harvested and threshed from stalks, pods, or other crop material, and conveyed away from a cleaning system 18 of machine 10 by a generally horizontal clean grain auger conveyor 20, to grain elevator 14. Grain elevator 14 then lifts the grain upwardly to grain delivery conveyor 12, which is operable for discharging the grain into grain tank 16 onto a floor 42 thereof. When grain tank 16 is filled with grain, or filled to a desired level, a grain unloading system including an unloading conveyor 22 can be operated for unloading the grain from tank 16, onto the ground, or into a wagon, truck or other vehicle, or a bin or the like, also as is well known.

When delivering grain to grain tank 16, it is desirable to distribute the grain evenly therein for better utilization, and to avoid overloading one side or end of harvester 10. It is also desirable in some instances to maintain the discharge outlet of the conveyor at at least some elevation above or at least near the top of the grain in tank 16 for good flow and to prevent clogging. A typical grain tank 16 is upwardly open and conveyor 12 can extend upwardly therefrom so as to be close to or above the level of grain therein. Additionally, tank 16 can include optional upwardly extending grain tank extensions 24 therearound which can be permanent, removable, or lowerable, such that machine 10 will not exceed height limitations for travel over public roads and under power and communication lines. As a result, it is desirable for conveyor 12 to be movable to a transport position below the transport height of the grain tank. More desirably, it would be advantageous for conveyor 12 to be positionable with a longitudinal axis A thereof in a range of positions or inclinations between about an inclination as shown in FIG. 1 for when grain tank 14 is full or near full, and a lower position or inclination, as denoted by axis A' for delivering grain to tank 16 when empty or near empty, and for transport.

Figure 2:
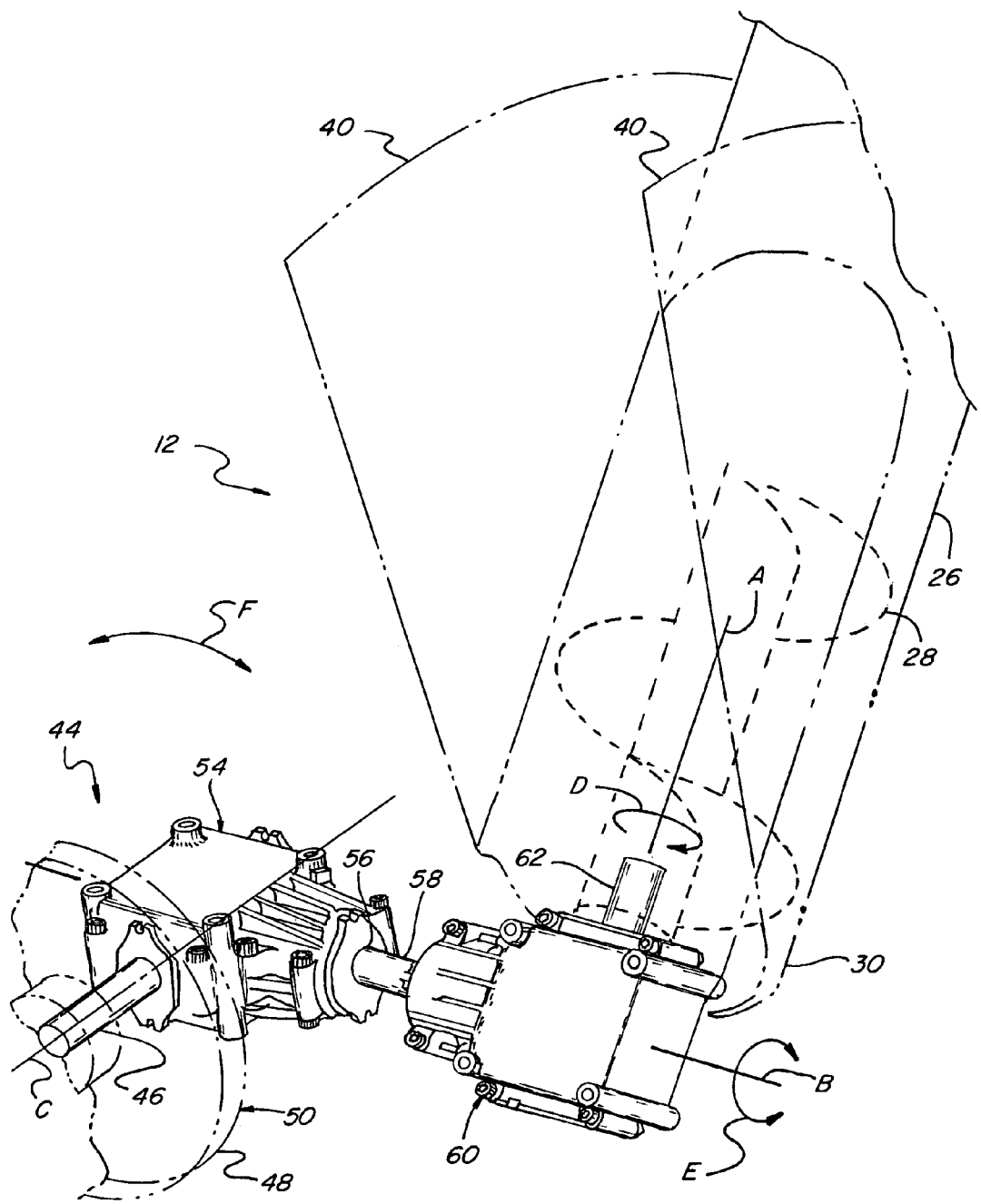
FIG. 2 is a perspective view of the conveyor of FIG. 1, showing a drive thereof and the relation thereof to a rotational power source.
Figure 3:
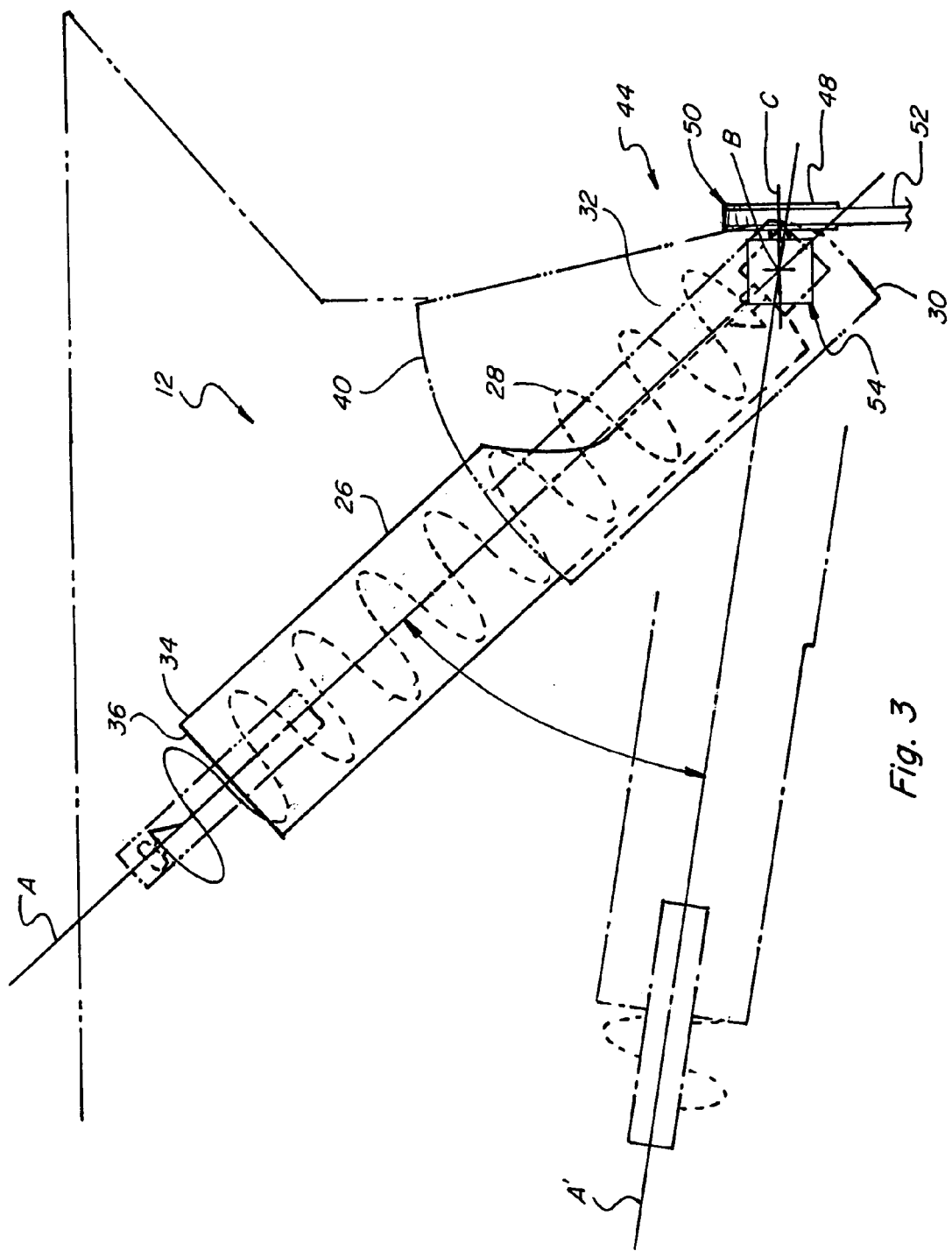
FIG. 3 is a simplified schematic representation of the conveyor and drive of FIGS. 1 and 2, showing different inclinations thereof within the grain tank.

Referring also to FIGS. 2 and 3, conveyor 12 is an assembly including an elongate housing 26 at least partially containing and enclosing an elongate rotatable element 28 which is preferably a helical auger. Housing 26 has a first or inlet end 30 including an upwardly open inlet opening 32 and a first end of auger 28 for receiving a flow of grain from grain elevator 14, and a longitudinally opposite outlet or free end 34 including an outlet opening 36 through which a free end of auger 28 protrudes for discharging grain carried through housing 26 by auger 28. Grain elevator 14 has an upper end 38 positioned just above inlet end 30 in position for discharging grain into inlet opening 32. To facilitate flow of the grain into opening 32, a pair of grain shields 40 preferably extend upwardly on opposite sides of inlet end 30, for guiding the grain into inlet opening 32.

As noted above, it is desirable to have the capability to position free end 34 of conveyor 12 at various positions or elevations above a bottom or floor 42 of grain tank 16, for better and more evenly distributing the grain over floor 42. Essentially, by having conveyor 12 oriented at a lower inclination, such as denoted by the location of axis A' in FIG. 1, grain discharged through outlet opening 36 will be discharged in a more horizontal direction toward the left hand side of grain tank 16. Then, as the angle of inclination of conveyor 12 increases, the grain will be discharged in a more upward direction so as to be distributed also toward the center and also toward the right hand side of grain tank 16. As a result, the grain will accumulate in a more centered, evenly distributed manner within tank 16. To achieve such variable incline capability, conveyor 12 is pivotable about an axis B, as will be explained.

To move grain upwardly along conveyor 12 from inlet end 30 to free end 34, auger 28 must be rotated, as denoted by arrow D in FIG. 2. This is accomplished using a drive 44 of the invention which receives rotational power from a sheave or sprocket 48 of a belt or chain drive 50 through a first rotatable input 46. Belt or chain drive 50 is connected to a source of rotational power (not shown) on machine 10 and is operable for rotating sheave or sprocket 48 via an endless belt or chain 52 in the well known manner. First input 46 and sheave or sprocket 48 are connected for joint rotation and are coaxial about a first axis C. First input 46 is preferably an input shaft of a first gear box 54 which is a right angle gear box including a first output 56 connected in rotatably driven relation to first input 46 and oriented so as to extend along a second axis B oriented at about a right angle or 90 degrees to axis A. First output 56, in turn, is rotatably drivingly connected to a second input 58 of a second gear box 60 which is also a right angle gear box and includes a second output 62 connected in rotatably driven relation to second input 58 and rotatable about axis A oriented at about a right angle to axis B. Second output 62 is connected in rotatably driving relation to auger 28 for rotating it about axis A. As a result, rotation of sheave or sprocket 48 by belt or chain 52 will rotate first input 46 about axis C, which will rotate first output 56 about axis B. First output 56 will rotate second input 58 about axis B, which, in turn, will rotate second output 62 and thus auger 26 about axis A, as denoted by arrow D.

Second gear box 60 and conveyor 12 will each be supported on combine 10 so as to be jointly pivotable about axis B, as denoted by arrow E, to allow varying the angular inclination of conveyor 12 about axis B and thus the location of free end 34 of the conveyor relative to the interior of the grain tank. Gear boxes 54 and 60 and conveyor 12 can also be optionally jointly pivotable or rotatable about axis C, as denoted by arrow F, to allow further varying the angular position of conveyor 12 about that axis, and thus providing additional flexibility in the positioning of the free end of the conveyor in the grain tank. For instance, by jointly pivoting second gear box 60 and conveyor 12 axis B from the position shown, free end 34 and thus outlet opening 36 of conveyor 12 can be moved sidewardly in tank 16, closer in the horizontal direction to drive 44 or farther therefrom. By jointly pivoting gear boxes 54 and 60 and conveyor 12 about axis C, free end 34 and outlet opening 36 can be moved more forwardly and rearwardly. These capabilities are demonstrated in FIGS. 4a, 4b, 4c, and 4d.

Figure 4A:
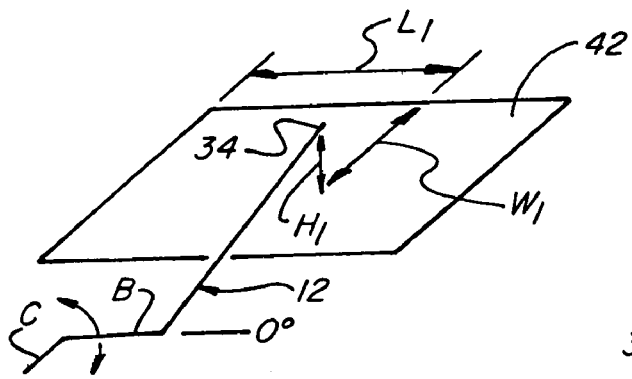
FIG. 4a is a simplified schematic representation of the conveyor and drive of FIG. 1 at one representative inclination relative to a floor of the grain tank.

In FIG. 4a, conveyor 12 is shown inclined about axis B such that free end 34 is at a height H1 above floor 42, a distance W1 from the opposite side of floor 42 and a distance L1 from one end. Axis B is at a zero degree angle to horizontal about axis C. This inclination is representative of a lower or transport position. In this position, grain will be discharged from free end 34 of the conveyor at a more sidewardly directed angle so as to deposit the grain more toward the opposite side of the tank.

Figure 4B:
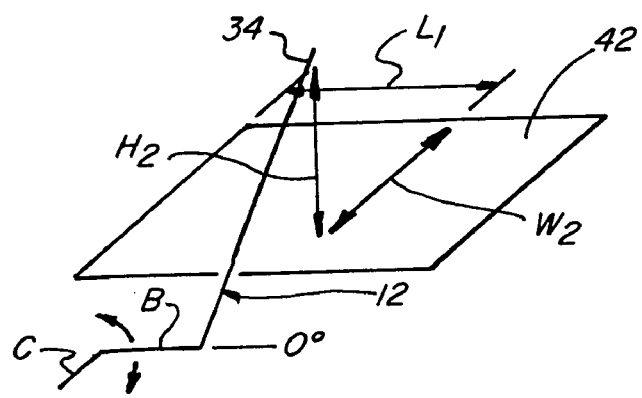
FIG. 4b is a simplified schematic representation of the conveyor and drive of FIG. 1 at another inclination relative to a floor of the grain tank.

In FIG. 4b, conveyor 12 is shown at a greater incline about axis B such that free end 34 is at a height H2 above floor 12, a distance W2 from the opposite side, and distance L1 from the end. Axis B is still at a zero degree angle to horizontal about axis C. H2 and W2 are greater than H1 and W1, respectively. This is representative of a possible position for delivering grain when the tank is fuller. In this position, grain will be discharged in a more upwardly directed angle and more in the center of the tank.

Figure 4C:
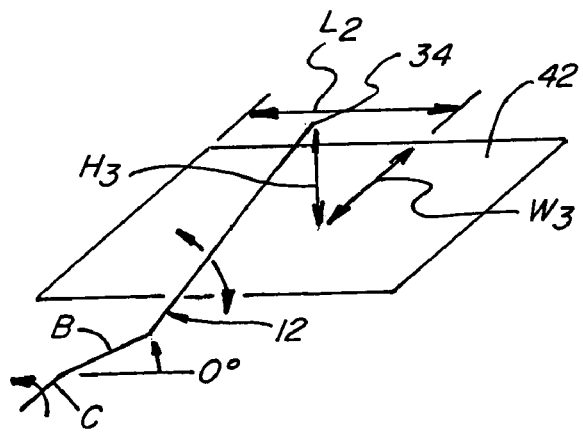
FIG. 4c is a simplified schematic representation of the conveyor and drive of FIG. 1 at another inclination relative to a floor of the grain tank.

In FIG. 4c, conveyor 12 is shown inclined about axis B and also upwardly pivoted about axis C such that free end 34 is at a height H3 above floor 42, a distance W3 from the opposite side, and a distance L2 from the end. L2 will be less than L1, such that grain delivery more toward one end of floor 42 will be achieved.

Figure 4D:
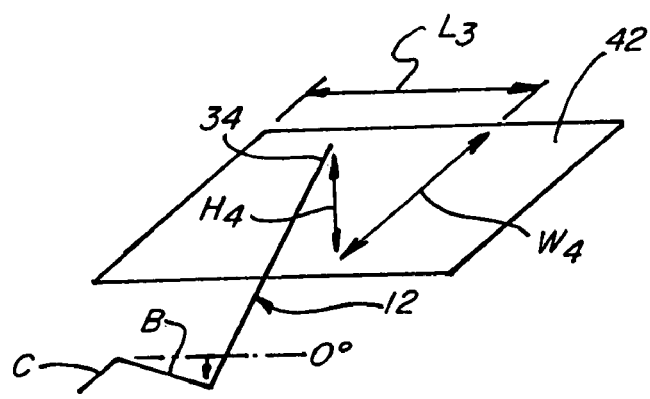
FIG. 4d is a simplified schematic representation of the conveyor and drive of FIG. 1 at still another inclination relative to a floor of the grain tank.

FIG. 4d shows another inclination of conveyor 12, pivoted upwardly about axis B and downwardly about axis C such that free end 34 is a height H3 above floor 42, a distance W4 from the opposite side, and a distance L3 from the end, which is greater than L1 and L2. This represents a position for delivery of grain more toward an opposite end of the grain tank.

Thus, it can be seen that by providing pivotability of a grain delivery conveyor, such as conveyor 12, about at least one axis relative to a grain tank, numerous beneficial grain delivery positions can be attained. A lowered transport or storage position is also possible, all without requiring foldability and its attendant problems. Better grain distribution over a larger area and within a larger grain tank is also possible, particularly larger in the front to rear direction when conveyor 12 is mounted beside the grain tank. Based on these examples, it should be evident that other pivotal manipulations can be used for positioning the grain delivery outlet at other desired positions and orientations within a grain tank. It should also be evident that the multi-angular capability of the present apparatus would provide utility for use with a wide variety of grain tank constructions and shapes and sizes, without significant modification.

Pivotal movement of conveyor 12 about either or both axes B and C can be powered in any suitable manner, such as by appropriate fluid cylinders, gear motors or the like, or can be manually done, and upward and downward movement can be effected by the level of grain in the tank. That is, conveyor 12 can rest on the grain and increase in inclination as the grain level rises and decrease in inclination as the grain level falls. Because pivotability and rotational power delivery are about common axes, power need not be interrupted to change the angle of the conveyor. Conveyor 12 and gear box 60 can be supported for pivotal movement about axis B using any suitable pins, hinges or the like.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A grain delivery conveyor for a grain tank of an agricultural combine, comprising:
    a first gear box including a first input connectable in rotatably driven relation to a rotatable power source for rotation about a first axis, and a first output rotatable about a second axis angularly related to the first axis by rotation of the first rotatable input;
    a second gear box including a second rotatable input connected in rotatably driven relation to the first output for rotation about the second axis, and a second output rotatably driveable about a third axis angularly related to the second axis by rotation of the second rotatable input; and
    an elongate conveyor assembly including a rotatable element having first end connected in rotatably driven relation to the second output and a longitudinally opposite free end, the rotatable element being at least partially contained within a longitudinally extending housing, the rotatable element and the housing being jointly pivotable about the second axis for varying a position of the free end relative to the grain tank between at least a first position at a low elevation close to a floor of the grain tank and a second position at a higher elevation in the grain tank, the first gear box being supported for pivotal movement about the first axis such that the first gear box, the second gear box, and the conveyor assembly are jointly pivotable about the first axis for varying a position of the free end relative to the grain tank.

2. The conveyor of claim 1, wherein the housing includes an inlet opening disposed above the first end of the rotatable element and at least one grain shield extending upwardly relative to the inlet opening for guiding grain flow into the inlet opening.

3. The conveyor of claim 1, wherein the rotatable element comprises an auger.

4. The conveyor of claim 1, wherein the second axis is oriented at about a right angle to the first axis.

5. The conveyor of claim 4, wherein the third axis is oriented at about a right angle to the second axis.

6. A grain delivery conveyor for a grain tank of an agricultural combine, comprising:
    a first gear box including a first rotatable input and a first rotatable output oriented at about a right angle to the first rotatable input, the first rotatable input being connectable in rotatably driven relation to a rotatable power source for rotatably driving the first rotatable output;
    a second gear box including a second rotatable input and a second rotatable output oriented at about a right angle to the second rotatable input, the second rotatable input being connected in rotatably driven relation to the first output, the second gear box being pivotable relative to the first gear box about a joint axis of rotation of the first output and the second input; and
    an elongate conveyor assembly including an elongate rotatable element extending through an elongate housing and having first end connected in rotatably driven relation to the second output and a longitudinally opposite free end, the rotatable element being rotatable within the housing for conveying grain therethrough from the first end to the free end for discharge from the housing, and the rotatable element and the housing being pivotable with the second gearbox about the joint axis of rotation of the first output and the second input for varying a position of the free end of the rotatable element in the grain tank, and wherein the first near box is supported for pivotal movement about a rotational axis of the first rotatable input such that the first gear box, the second gear box, and the conveyor assembly are jointly pivotable about the axis of rotation of the first input of the first gear box for further varying a position of the free end of the rotatable element in the grain tank.

7. The conveyor of claim 6, wherein the second gear box and the conveyor assembly are pivotable about the joint axis of rotation of the first output and the second input for varying the position of the free end of the rotatable element generally vertically in the grain tank and the first gear box, second gear box, and the conveyor assembly are jointly pivotable about the axis of rotation of the first input of the first gear box for varying the position of the free end of the rotatable element generally horizontally in the grain tank.

8. The conveyor of claim 7, wherein the joint axis of rotation of the first output and the second input is oriented at about a right angle to the axis of rotation of the first input.

9. The conveyor of claim 6, wherein the rotatable element comprises an auger.

10. A variably angularly inclinable grain delivery auger for a grain tank of an agricultural combine, comprising:

a first gear box including a first input connectable in rotatably driven relation to a rotatable power source for rotation about a first axis, and a first output rotatable about a second axis oriented at about a right angle to the first axis by rotation of the first rotatable input;

a second gear box including a second rotatable input connected in rotatably driven relation to the first output for rotation about the second axis, and a second output rotatably driveable about a third axis oriented at about a right angle to the second axis by rotation of the second rotatable input; and an auger assembly including an elongate auger having a first end connected in rotatably driven relation to the second output and a longitudinally opposite free end, the auger being at least partially contained within a longitudinally extending housing, the auger assembly being jointly pivotable about the second axis, and the gear boxes and the auger assembly being jointly pivotable about the first axis, for varying a position of the free end of the auger relative to the grain tank between at least a first position at a low elevation close to a floor of the grain tank and a second position at a higher elevation in the grain tank.

\* \* \* \* \*